United States Patent
Chen et al.

(10) Patent No.: US 11,557,147 B2
(45) Date of Patent: Jan. 17, 2023

(54) SYSTEMS AND METHODS FOR SELECTING A BEST FACIAL IMAGE OF A TARGET HUMAN FACE

(71) Applicant: ZHEJIANG DAHUA TECHNOLOGY CO., LTD., Zhejiang (CN)

(72) Inventors: Guang Chen, Hangzhou (CN); Xing Liu, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 89 days.

(21) Appl. No.: 17/171,242

(22) Filed: Feb. 9, 2021

(65) Prior Publication Data

US 2021/0166003 A1    Jun. 3, 2021

Related U.S. Application Data

(63) Continuation of application No. PCT/CN2019/099998, filed on Aug. 9, 2019.

(30) Foreign Application Priority Data

Aug. 22, 2018 (CN) .......................... 201810962203.7

(51) Int. Cl.
*G06V 40/16* (2022.01)
*G06V 10/98* (2022.01)

(52) U.S. Cl.
CPC .......... *G06V 40/173* (2022.01); *G06V 10/993* (2022.01); *G06V 40/166* (2022.01); *G06V 40/169* (2022.01)

(58) Field of Classification Search
CPC ............... G06V 40/173; G06V 10/993; G06V 40/166; G06V 40/169; G06V 40/172;
(Continued)

(56) References Cited

U.S. PATENT DOCUMENTS 9,971,933 B1   5/2018 Shen
2005/0129290 A1*  6/2005 Lo ....................... G06V 40/168
                                                                 382/124
(Continued)

FOREIGN PATENT DOCUMENTS

CN   102799877 A   11/2012
CN   103942525 A    7/2014
(Continued)

OTHER PUBLICATIONS

International Search Report in PCT/CN2019/099998 dated Nov. 4, 2019, 4 pages.
Written Opinion in PCT/CN2019/099998 dated Nov. 4, 2019, 5 pages.
(Continued)

*Primary Examiner* — Nimesh Patel
(74) *Attorney, Agent, or Firm* — Metis IP LLC

(57) ABSTRACT

The present disclosure relates to systems and methods for selecting a best facial image of a target human face. The methods may include determining whether a candidate facial image is obtained before a time point in a time period threshold, wherein the candidate facial image has a greatest quality score of the target human face among a plurality of facial images of the target human face; in response to a determination that the candidate facial image is obtained before the time point, determining the candidate facial image as the best facial image of the target human face; and storing the best facial image together with a face ID and the greatest quality score of the target human face in a face log.

16 Claims, 7 Drawing Sheets

(58) Field of Classification Search
CPC ...... G06V 40/50; G06V 40/161; G06V 40/16; G06V 20/00; G06V 40/23; G06V 10/462; G06V 10/765; G06V 20/52; G06V 10/96; G06V 20/597; G06V 40/13; G06V 40/20; G06V 10/507; G06V 20/80; G06V 40/10; G06V 10/20; G06V 20/64; G06V 40/1359; G06V 40/1365; G06V 40/15; G06V 40/168; G06V 40/171; G06T 2207/30168; G06T 2207/30201; G06T 7/0002; G06T 7/20; G06T 19/006; G06T 7/0012; G06T 2200/24; G06T 7/00; G06T 1/00; G06T 11/80; G06T 17/00; G06T 7/246; G06T 1/0021; G06T 2201/0051; H04W 4/027; H04W 4/025; H04W 4/023; H04W 4/40; H04W 52/0251; G06F 21/32; G06F 3/0484; G06F 3/04842; G06F 21/44; G06F 16/24552; G06F 2221/2111; G06F 21/31; G06F 21/445; G06F 21/6245; G06F 21/64; G06F 2221/2129; G06F 21/35; G06F 2221/2133; G06F 16/50; G06F 16/00; G06F 16/245; G06F 21/604; G06F 21/6272; G06F 2221/2117; G06F 2221/2141; G16H 40/67; G16H 40/63; G16H 50/20; G16H 10/60; G16H 80/00; G06N 20/00; G06N 3/08; G06K 9/6255; G06K 19/0728; G06K 9/6201; G06K 19/00; G06K 19/06196; G06K 7/10762; G06K 9/00

See application file for complete search history.

(56) References Cited

U.S. PATENT DOCUMENTS

| | | |
|---|---|---|
| 2007/0269082 A1 | 11/2007 | Matsuyama |
| 2008/0267458 A1 | 10/2008 | Laganiere et al. |
| 2013/0063581 A1* | 3/2013 | Komatsu ............... G06V 40/50 348/E7.085 |
| 2013/0266181 A1 | 10/2013 | Brewer et al. |
| 2014/0012400 A1* | 1/2014 | Hidaka ............... F21V 23/0478 700/28 |
| 2016/0350334 A1 | 12/2016 | Bataller et al. |

FOREIGN PATENT DOCUMENTS

| | | |
|---|---|---|
| CN | 104794439 A | 7/2015 |
| CN | 105938552 A | 9/2016 |
| CN | 106446851 A | 2/2017 |
| CN | 107256388 A | 10/2017 |
| CN | 108229260 A | 6/2018 |
| CN | 108288261 A | 7/2018 |
| CN | 108346139 A | 7/2018 |
| CN | 106815575 B | 12/2019 |
| WO | 2016164720 A1 | 10/2016 |
| WO | 2018111287 A1 | 6/2018 |
| WO | 2020038242 A1 | 2/2020 |

OTHER PUBLICATIONS

Wu, Xian et al., A Method of Selecting Source Data of Pictures in the Modeling of Face Detection, Applied Science and Technology, 42(1): 33-35, 2015.

The Extended European Search Report in European Application No. 19852760.8 dated Jul. 23, 2021, 8 pages.

* cited by examiner

SYSTEMS AND METHODS FOR SELECTING A BEST FACIAL IMAGE OF A TARGET HUMAN FACE

CROSS-REFERENCE TO RELATED APPLICATIONS

This application is a continuation of International Application No. PCT/CN2019/099998, filed on Aug. 9, 2019, which claims priority of Chinese Application No. 201810962203.7, filed on Aug. 22, 2018, the contents of which are incorporated herein in its entirety by reference.

TECHNICAL FIELD

The present disclosure generally relates to systems and methods for image processing, and more particularly, to systems and methods for selecting a best facial image of a target human face.

BACKGROUND

With the developments of image processing, the face recognition technology is widely used in door control systems, secure-access systems, and information collection systems, etc. During a face recognition process, due to the poor quality of a facial image, a target face usually cannot be recognized or exactly recognized. Therefore, how to select a high-quality facial image in face recognition has become an important problem. Some existing methods for selecting a high-quality facial image usually is to put the target face in a certain area to obtain a high-quality image and further identify the target face by extracting attributes of the target face from the high-quality image. Some existing methods for selecting a high-quality facial image usually only uses a clarity of the target face in an image to determine the quality of the facial image. The target face may be tracked in a video streaming, and the highest-quality facial image may be output until the target human face is disappeared in the video streaming. However, it is not suitable for some application scenarios, such as security monitoring systems, passenger flow analysis, situations with a large number of people, or situations with wide views. In addition, the existing methods result in a low processing speed, a long delay, a high cache usage, and a high pressure to the cache. Thus, it is desirable to provide systems and methods for selecting a best facial image efficiently and rapidly to realize a real-time face recognition and a low-cost system.

SUMMARY

An aspect of the present disclosure introduces a system for selecting a best facial image of a target human face. The system may include at least one storage medium including a set of instructions for selecting the best facial image including the target human face, and at least one processor in communication with the storage medium. When executing the set of instructions, the at least one processor may perform the following operations. The at least one processor may determine whether a candidate facial image is obtained before a time point in a time period threshold, wherein the candidate facial image has a greatest quality score of the target human face among a plurality of facial images of the target human face; in response to a determination that the candidate facial image is obtained before the time point, determine the candidate facial image as the best facial image of the target human face; and store the best facial image together with a face ID and the greatest quality score of the target human face in a face log.

In some embodiments, before determining whether the candidate facial image is obtained before the time point, the at least one processor may further determine whether a detecting time period of the target human face is greater than the time period threshold; in response to a determination that the detecting time period is greater than the time period threshold, determine whether the candidate facial image is obtained before the time point.

In some embodiments, the at least one processor may further in response to a determination that the candidate facial image is obtained after the time point, increase the time period threshold; and operate a candidate facial image determining procedure.

In some embodiments, the at least one processor may further in response to a determination that the detecting time period is not greater than the time period threshold, operate a candidate facial image determining procedure.

In some embodiments, to operate the candidate facial image determining procedure, the at least one processor may further obtain an image periodically from an image acquiring device; for each image, obtain at least one human face from the image; for each of the at least one human face in a current image, determine a current quality score of the human face; determine whether the human face is the target human face that has been stored in the face log; in response to a determination that the human face is the target human face, obtain the stored facial image of the target human face and the stored greatest quality score thereof from the face log; and select the candidate facial image from the stored facial image and the current image based on the current quality score and the stored quality score.

In some embodiments, the at least one processor may further in response to a determination that the human face is not the target human face, determine whether the human face is a newly-appeared human face; and in response to a determination that the human face is the newly-appeared human face, store the newly-appeared human face in the face log together with the current quality score thereof and a new face ID.

In some embodiments, to determine the current quality score of the human face, the at least one processor may further obtain an angle score of the human face in the current image; and obtain an angle weight of the human face.

In some embodiments, the at least one processor may further obtain a clarity score of the human face in the current image; and obtain a clarity weight of the human face.

In some embodiments, the at least one processor may further obtain a size score of the human face in the current image; and obtain a size weight of the human face.

In some embodiments, the at least one processor may further determine the current quality score of the human face based on the angle score, the angle weight, the clarity score, the clarity weight, the size score, and the size weight.

According to another aspect of the present disclosure, a method for selecting a best facial image of a target human face is provided. The method may include determining whether a candidate facial image is obtained before a time point in a time period threshold, wherein the candidate facial image has a greatest quality score of the target human face among a plurality of facial images of the target human face; in response to a determination that the candidate facial image is obtained before the time point, determining the candidate facial image as the best facial image of the target human face; and storing the best facial image together with a face ID and the greatest quality score of the target human face in a face log.

According to still another aspect of the present disclosure, a non-transitory computer-readable medium, comprising at least one set of instructions compatible for selecting a best facial image of a target human face is provided. When executed by at least one processor of an electrical device, the at least one set of instructions may direct the at least one processor to perform the following operations. The at least one processor may determine whether a candidate facial image is obtained before a time point in a time period threshold, wherein the candidate facial image has a greatest quality score of the target human face among a plurality of facial images of the target human face; in response to a determination that the candidate facial image is obtained before the time point, determine the candidate facial image as the best facial image of the target human face; and store the best facial image together with a face ID and the greatest quality score of the target human face in a face log.

According to still another aspect of the present disclosure, a system for selecting a best facial image of a target human face is provided. The system may include a time point determining module, configured to determine whether a candidate facial image is obtained before a time point in a time period threshold, wherein the candidate facial image has a greatest quality score of the target human face among a plurality of facial images of the target human face; a best facial image determining module, configured to in response to a determination that the candidate facial image is obtained before the time point, determine the candidate facial image as the best facial image of the target human face; and a storing module, configured to store the best facial image together with a face ID and the greatest quality score of the target human face in a face log.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating an exemplary process for operating a candidate facial image determining procedure according to some embodiments of the present disclosure; and.

DETAILED DESCRIPTION

Figure 1:
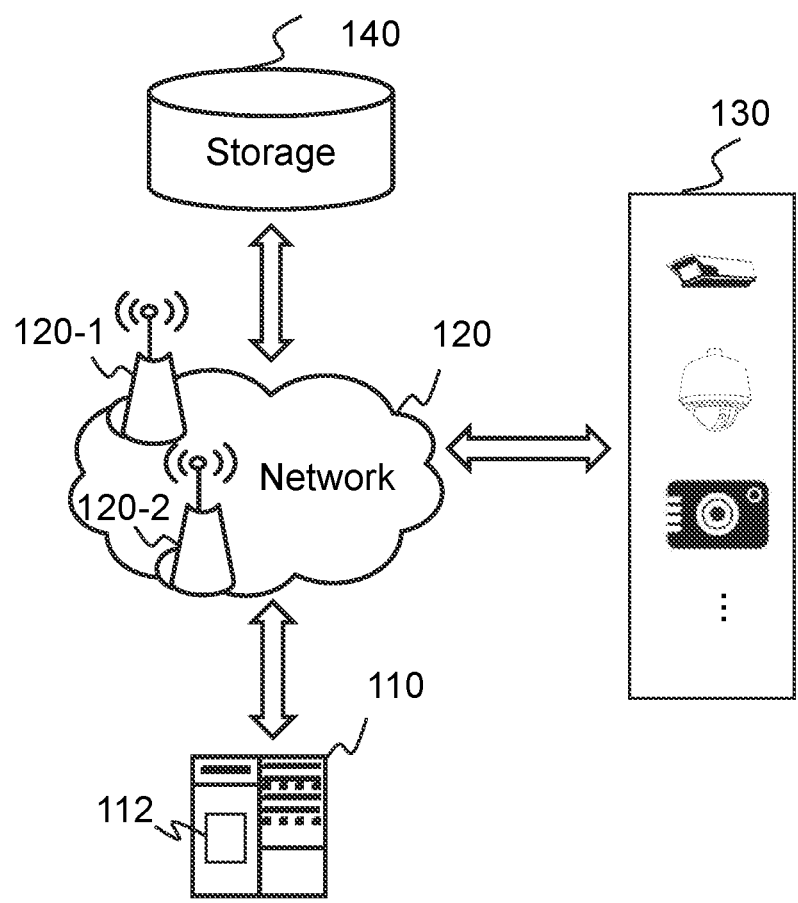
FIG. 1 is a schematic diagram illustrating an exemplary system for selecting a best facial image of a target human face according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for selecting a best facial image of a target human face. To this end, the systems and methods may set a detecting time period threshold and a time point in the time period threshold to determine a changing trend of image quality of the target human face when tracking the target human face in a video or a plurality of sequential images. When the systems and methods detect the target human face for the detecting time period threshold, the time point may be used as a demarcation point for predicting the image quality of the target human face becomes better or worse by the current time point. The systems and methods may calculate a quality score for each facial image periodically obtained from an image acquiring device and compare the quality scores of a plurality of facial images to find out a facial image with the greatest quality score. If the facial image with the greatest quality score is obtained before the demarcation time point, the systems and methods may predict that the image quality of the target human face becomes worse, and may select the corresponding facial image as the best or highest-quality image of the target human face. However, if the facial image with the greatest quality score is obtained after the demarcation time point, the systems and methods may predict that the image quality of the target human face becomes better, and may continue to obtain more facial images until the image quality of the target human face becomes worse. In this way, the best or highest-quality image of the target human face may be selected rapidly and effectively to realize a real-time face recognition and a low-cost system.

FIG. 1 is a schematic diagram of an exemplary system 100 for selecting a best facial image of a target human face according to some embodiments of the present disclosure. The system 100 may include a server 110, a network 120, a camera 130, and a storage 140.

The server 110 may be configured to process information and/or data relating to selecting the best facial image of the target human face. For example, the server 110 may determine the best facial image of the target human face. As another example, the server 110 may store the best facial image together with a face ID and the greatest quality score of the target human face in a face log. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the camera 130, and/or the storage 140 via the network 120. As another example, the server 110 may connect the camera 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the best facial image to perform one or more functions described in the present disclosure. For example, the processing engine 112 may determine the best facial image. As another example, the processing engine 112 may store the best facial image together with information of the best facial image. In some embodiments, the processing engine 112 may include one or more processing engines (e.g., single-core processing engine (s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components of the system 100 (e.g., the server 110, the camera 130, and the storage 140) may transmit information and/or data to other component(s) in the system 100 via the network 120. For example, the server 110 may obtain video or a plurality of facial images of the target human face from the camera 130 via the network 120. As another example, the server 110 may obtain an image periodically from the camera 130 via the network 120. In some embodiments, the network 120 may be any type of wired or wireless network, or combination thereof. Merely by way of example, the network 120 may be a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the system 100 may be connected to the network 120 to exchange data and/or information between them.

The camera 130 may be any electronic device that is capable of capturing images or videos. For example, the camera 130 may include an image sensor, a video recorder, or the like, or any combination thereof. In some embodiments, the camera 130 may include any suitable types of camera, such as a fixed camera, a fixed dome camera, a covert camera, a Pan-Tilt-Zoom (PTZ) camera, a thermal camera, or the like, or any combination thereof. In some embodiments, the camera 130 may further include at least one network port. The at least one network port may be configured to send information to and/or receive information from one or more components in the system 100 (e.g., the server 110, the storage 140) via the network 120. In some embodiments, the camera 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store data obtained from the camera 130 (e.g., video or images of a human face). As another example, the storage 140 may store a face log including a plurality of human faces together with corresponding face IDs and quality scores thereof. As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the camera 130) via the at least one network port. One or more components in the system 100 may access the data or instructions stored in the storage 140 via the network 120. In some embodiments, the storage 140 may be directly connected to or communicate with one or more components in the system 100 (e.g., the server 110, the camera 130). In some embodiments, the storage 140 may be part of the server 110.

Figure 2:
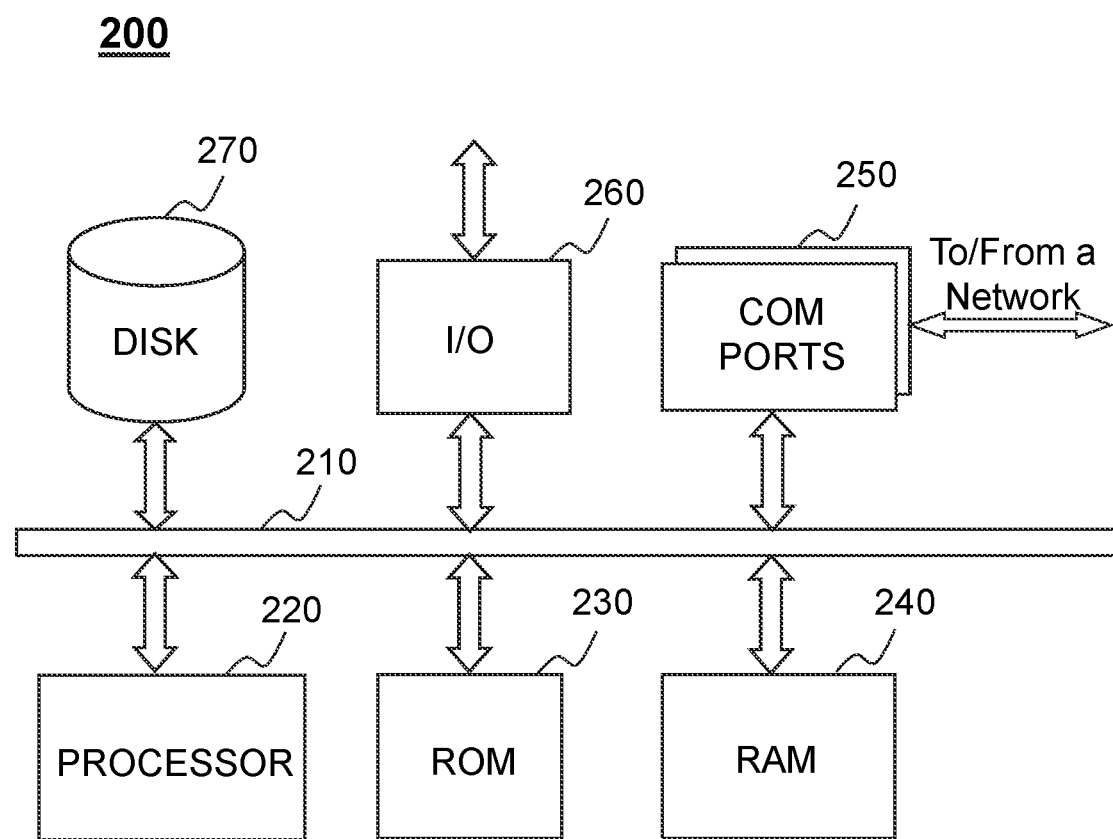
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the camera 130 may be implemented according to some embodiments of the present disclosure. For example, the processing engine 112 may be implemented on the computing device 200 and configured to perform functions of the processing engine 112 disclosed in this disclosure.

The computing device 200 may be used to implement a system 100 for the present disclosure. The computing device 200 may be used to implement any component of system 100 that perform one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the camera 130) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
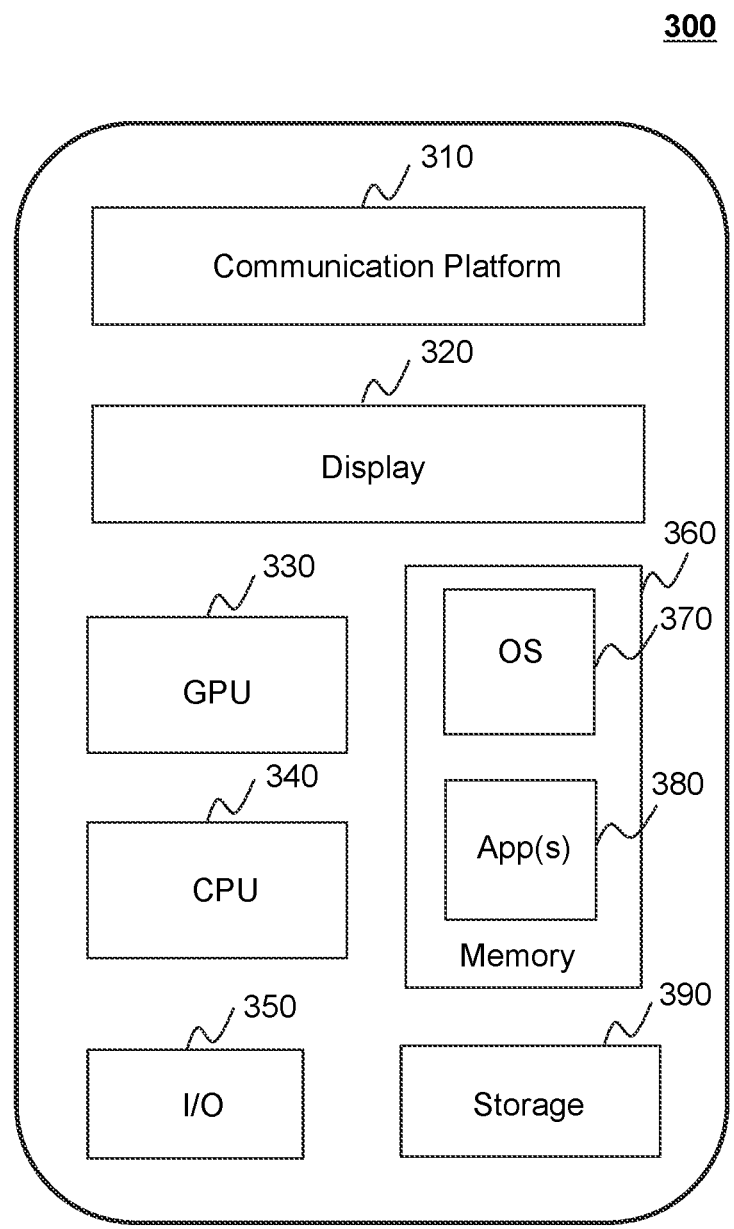
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the server 110 or the camera 130 may be implemented according to some embodiments of the present disclosure.

As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the route planning service. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the system 100, and/or other components of the system 100 described with respect to FIGS. 1-7). The hardware elements, operating systems and programming languages of such computers are conventional in nature, and it is presumed that those skilled in the art are adequately familiar therewith to adapt those technologies to select the best facial image of the target human face as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
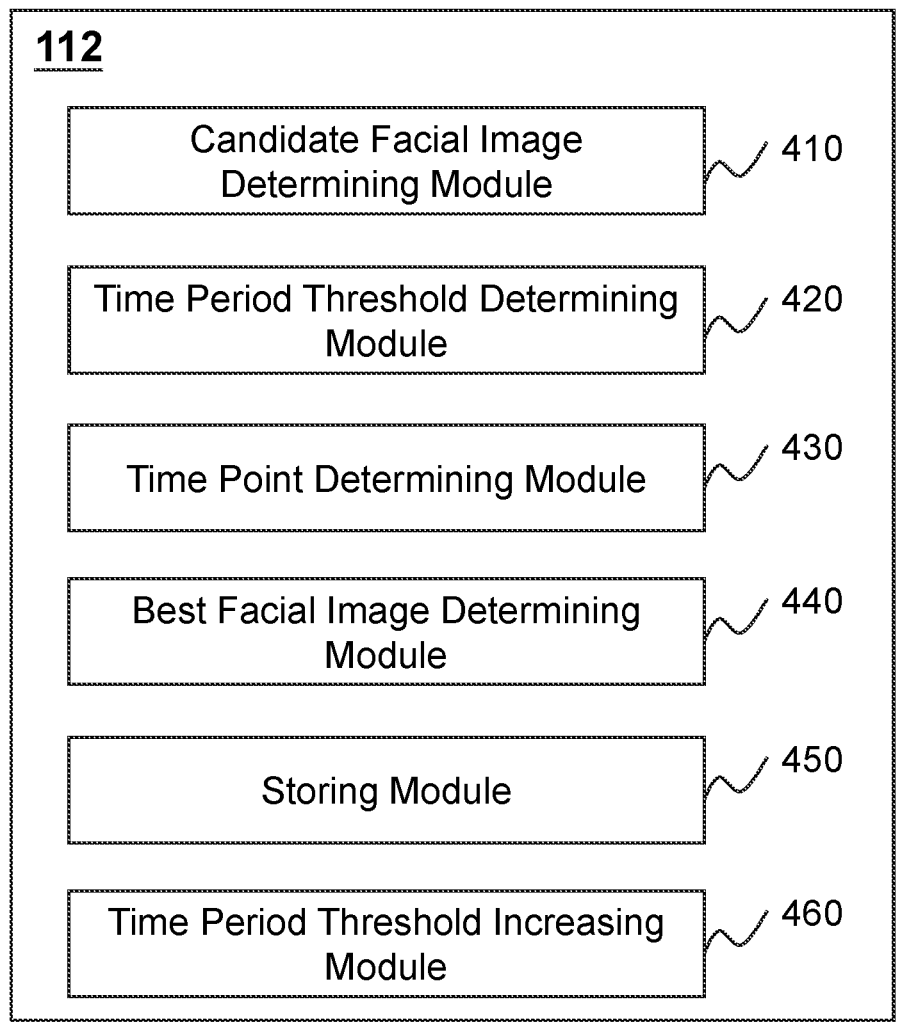
FIG. 4 is a block diagram illustrating an exemplary processing engine according to some embodiments of the present disclosure.

FIG. 4 is a block diagram illustrating an exemplary processing engine 112 according to some embodiments of the present disclosure. As illustrated in FIG. 4, the processing engine 112 may include a candidate face image determining module 410, a time period threshold determining module 420, a time point determining module 430, a best facial image determining module 440, a storing module 450, and a time period threshold increasing module 460.

The candidate face image determining module 410 may be configured to operate a candidate facial image determining procedure. In some embodiments, after operating the candidate facial image determining procedure on a video or a plurality of images, the candidate face image determining module 410 may obtain the candidate facial image of the target human face or obtain candidate facial images of a plurality of human faces. Each of the plurality of human faces may have a candidate facial image that has the best quality of the corresponding human face by the current time point.

The time period determining module 420 may be configured to determine whether a detecting time period of a target human face is greater than a time period threshold.

The time point determining module 430 may be configured to determine whether the candidate facial image is obtained before a time point in the time period threshold.

The best facial image determining module 440 may be configured to determine the best facial image. For example, the best facial image determining module 440 may determine the candidate facial image as the best facial image of the target human face if the detecting time period of the target human face is greater than the time period threshold and the candidate facial image is obtained before the time point of the time period threshold.

The storing module 450 may be configured to store the best facial image together with a face ID and the greatest quality score of the target human face in a face log.

The time period threshold increasing module 460 may be configured to increase the time period threshold.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the time period determining module 420 and the time point determining module 430 may be integrated as one module to both determine whether the detecting time period is greater than the time period threshold and whether the candidate facial image is obtained before the time point.

Figure 5:
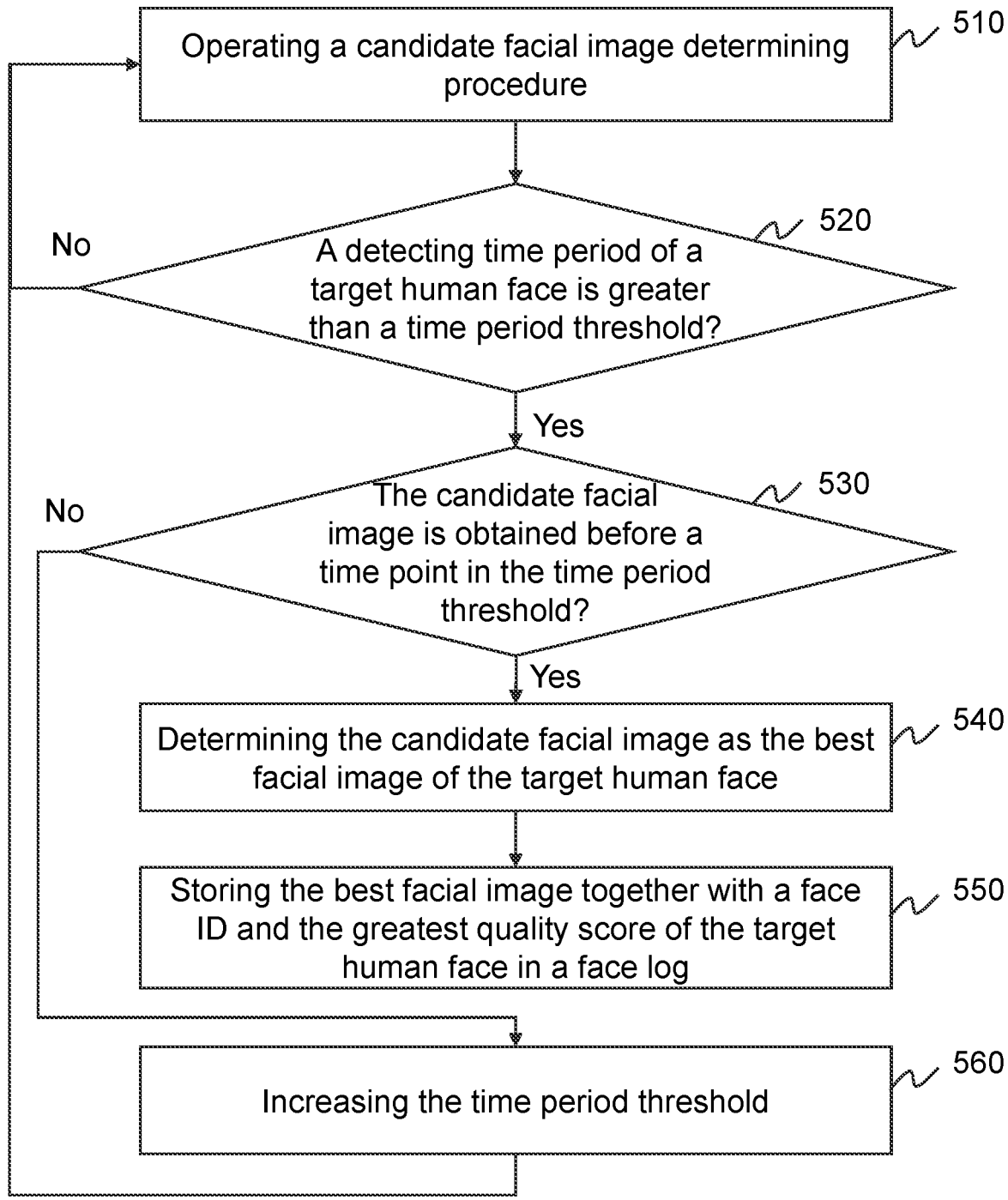
FIG. 5 is a flowchart illustrating an exemplary process for selecting a best facial image of a target human face according to some embodiments of the present disclosure.

FIG. 5 is a flowchart illustrating an exemplary process 500 for selecting a best facial image of a target human face according to some embodiments of the present disclosure. The process 500 may be executed by the system 100. For example, the process 500 may be implemented as a set of instructions (e.g., an application) stored in the storage ROM 230 or the RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the candidate facial image determining module 410) may operate a candidate facial image determining procedure.

In some embodiments, the candidate face image may be an image that includes a target human face therein. In the candidate face image, the quality of the target human face may be the best among a plurality of images that include the target human face therein. The quality of the target human face may reflect a performance of the target human face in an image. For example, the quality may be determined by a size of the target human face in the image, an angle of the target human face in the image, a clarity of the target human face in the image, or the like, or any combination thereof. In some embodiments, the size of the target human face may reflect how large the target human face appears in the image. The angle of the target human face may reflect a direction that the target human face is pointing in the image. For example, the angle of a front target human face may be larger than a side target human face. The clarity of the target human face may reflect how clear that target human face is shown in the image. For example, the processing engine 112 may obtain a video from an image acquiring device (e.g., the camera 130) that tracks the target human face in real-time. The processing engine 112 may periodically select an image from the video to obtain the plurality of images, and identify the target human face in the plurality of images. In some embodiments, the processing engine 112 may determine a quality score that represents a quality of the target human face of each of the plurality of images. The processing engine 112 may compare the quality scores and determine an image with the greatest quality score of the target human face as the candidate face image.

In some embodiments, the candidate facial image determining procedure may be a process or an algorithm for determining an image in which the target human face is identified as the best quality by the current time point. In some embodiments, after operating the candidate facial image determining procedure on a video or a plurality of images, the processing engine 112 may obtain the candidate facial image of the target human face. In some embodiments, after operating the candidate facial image determining procedure on a video or a plurality of images, the processing engine 112 may obtain candidate facial images of a plurality of human faces. Each of the plurality of human faces may have a candidate facial image that has the best quality of the corresponding human face by the current time point. In some embodiments, the candidate facial image determining procedure may be found elsewhere in the present disclosure (e.g., FIG. 6 and the description thereof).

In 520, the processing engine 112 (e.g., the processor 220, the time period determining module 420) may determine whether a detecting time period of a target human face is greater than a time period threshold.

In some embodiments, the detecting time period may reflect how long the target human face has been detected. For example, the detecting time period of the target human face may be an accumulation of time from a time when the target human face was first detected to the current time point. As another example, the detecting time period may be represented as a count of times that the target human face was identified or detected in the video. The processing engine 112 may periodically obtain an image from the video and identify or detect the target human face in the images. The count of times that the target human face was identified or detected may reflect how long the target human face has been detected.

In some embodiments, the time period threshold may be a threshold for determining the trend changing of image quality of the target human face. If the target human face has been detected or tracked for enough time (e.g., greater than the time period threshold), the processing engine 112 may further determine whether to determine the best facial image of the target human face. In some embodiments, the time period threshold may be predetermined by the processing engine 112 or an operator thereof, and stored in a storage device (e.g., the storage 140, the ROM 230 or the RAM 240, etc.). In some embodiments, the processing engine 112 may determine the time period threshold according to different application scenes. For example, if the size of the target human face firstly appeared in the video is large, the processing engine 112 may set a short time period threshold. If the size of the target human face firstly appeared in the video is small, the processing engine 112 may set a long time period threshold. As another example, the operator of the processing engine 112 may set a different time period threshold for a security monitoring system from that of a passenger flow analysis system. Merely by way of example, the time period threshold may be 1 minute, 5 minutes, 10 minutes, 30 minutes, etc.

In some embodiments, the processing engine 112 may determine the detecting time period of the target human face based on acquiring time of images in the video. For example, the detecting time period may be a time difference between the current time point and a first acquiring time point of an image in which the target human face was firstly appeared. In some embodiments, the processing engine 112 may access the storage device (e.g., the storage 140, the ROM 230 or the RAM 240, etc.) to obtain the time period threshold, and compare the detecting time period with the time period threshold.

In 530, in response to a determination that the detecting time period is greater than the time period threshold, the processing engine 112 (e.g., the processor 220, the time point determining module 430) may determine whether the candidate facial image is obtained before a time point in the time period threshold.

In some embodiments, the time point in the time period threshold may be a demarcation point for predicting the image quality of the target human face becomes better or worse by the current time point. For example, if the candidate facial image in which the target human face is identified as best quality by the current time point is obtained before the time point, the processing engine 112 may predict that during the time period threshold the image quality of the target human face becomes worse. IF the candidate facial image is obtained after the time point, the processing engine 112 may predict that during the time period threshold the image quality of the target human face becomes better, and the image quality of the target human face may become better after the time period threshold.

In some embodiments, the time point may be arbitrarily predetermined based on the time period threshold and stored in a storage device (e.g., the storage 140, the ROM 230 or the RAM 240, etc.). For example, the time point may divide the time period threshold into two parts. A previous first part may be less than a later second part. In some embodiments, the time point may be located at $1/3$, $1/4$, $1/5$, etc., of the time period threshold. For example, if the time period threshold is twelve minutes, the time point may be located at the fourth minute. That is to say, the processing engine 112 may determine whether the target human face is detected for greater than twelve minutes. If so, the processing engine 112 may further determine whether the candidate facial image that including the best quality of the target human face by the current time point is obtained before the fourth minute in the twelve minutes. If so, the processing engine 112 may predict that the image quality of the target human face becomes worse. In some embodiments, the time point may be determined by the processing engine 112 or the operator thereof according to different application scenes. For example, the time point may be set as a different value in a security monitoring system from that of a passenger flow analysis system. As another example, the operator may set the time point according to experimental data or historical data.

In 540, in response to a determination that the candidate facial image is obtained before the time point, the processing engine 112 (e.g., the processor 220, the best facial image determining module 440) may determine the candidate facial image as the best facial image of the target human face.

In some embodiments, the best facial image may be an optimized image of the target human face. The processing engine 112 may predict that in the best facial image, the target human face is identified as the best quality not only by the current time point but also in the future. In some embodiments, after determining that the candidate facial image in which the target human face is identified as best quality by the current time point is obtained before the time point, the processing engine 112 may predict that during the time period threshold the image quality of the target human face becomes worse. The processing engine 112 may stop detecting or tracking the target human face, and determine the candidate facial image as the best facial image of the target human face. In some embodiments, the best facial image may be used for further applications. For example, the best facial image may be used for detecting attributes of the target human face. Using the best facial image of the target human face, attributes of the target human face (e.g., an age, a skin color, etc.) may be determined. As another example, the best facial image may be used for identifying or tracking the target human face. In this way, the processing speed for selecting the best facial image is increased, the delay and cache usage are reduced to improve user experiences.

In 550, the processing engine 112 (e.g., the processor 220, the storing module 450) may store the best facial image together with a face ID and the greatest quality score of the target human face in a face log.

In some embodiments, the processing engine 112 may create a face ID for the target human face. The face ID may represent an identity of the target human. For example, the face ID may be represented as a name, a series of numbers, a code (e.g., a bar code, a QR code, etc.), a symbol, a value, or the like, or any combination thereof. In some embodiments, each face ID may correspond to only one human.

In some embodiments, the face log may store a plurality of best facial images of a plurality of human faces, the corresponding face ID, the greatest quality scores of the plurality of human faces, or the like, or any combination thereof. The processing engine 112 may access the face log to obtain any one best facial image for further use (e.g., tracking a human, detecting attribute of a human, etc.). In some embodiments, the face log may be stored in a storage device (e.g., the storage 140, the ROM 230 or the RAM 240, etc.), or may be part of the storage device.

In some embodiments, by determining the quality score of the target human face and determining the trend changing of image quality of the target human face, the best facial image may be selected rapidly from the face log. The process for selecting the best facial image is simple and real-time. The cost of hardware is reduced effectively.

In 560, in response to a determination that the candidate facial image is not obtained before the time point, the processing engine 112 (e.g., the processor 220, the time period threshold increasing module 460) may increase the time period threshold.

In some embodiments, in response to the determination that the candidate facial image is obtained after the time point, the processing engine 112 may predict that the image quality of the target human face may become better if tracking the target human face continues. The processing engine 112 may increase the time period threshold, and continue to operate the candidate facial image determining procedure (Step 510 of the process 500). In some embodiments, the processing engine 112 may stop the process 500 until the best facial image of the target human face is determined, otherwise, the processing engine may loop steps 510, 520, 530, and 560 of the process 500.

In some embodiments, the processing engine 112 may increase the time period threshold according to a predetermined rule. For example, the time period threshold in the last loop is 10 minutes, the processing engine 112 may increase 5 minutes after each determination that the candidate facial image is not obtained before the time point. The time point in the current loop may be varied with the increasing of the time period threshold. For example, after increasing 5 minutes to the last time period threshold, the current time period threshold is 15 minutes, and the corresponding current time point may be the fifth minute (⅓ of the 15 minutes). In some embodiments, the predetermined rule for increasing the time period threshold may be determined by the processing engine 112 according to different application scenes or by the operator thereof according to historical experiences.

It should be noted that the above description is merely provided for the purposes of illustration, and not intended to limit the scope of the present disclosure. For persons having ordinary skills in the art, multiple variations and modifications may be made under the teachings of the present disclosure. For example, operations 520 and 530 may be integrated into one step for determining whether it is time for obtaining the best facial image. As another example, the time period threshold and the time point are only two ways for expressing how long the target human face is detected and when the candidate facial image is obtained during detecting or tracking the target human face. Other express ways, for example, the processing engine 112 obtains an image periodically, the time period threshold may be represented as a count of images, and the time point may be represented as a sequence number of image in the count. As still another example, other alternatives do exist and other factors may be taken into consideration in the determination of the target path. However, those variations and modifications do not depart from the scope of the present disclosure.

Figure 6:
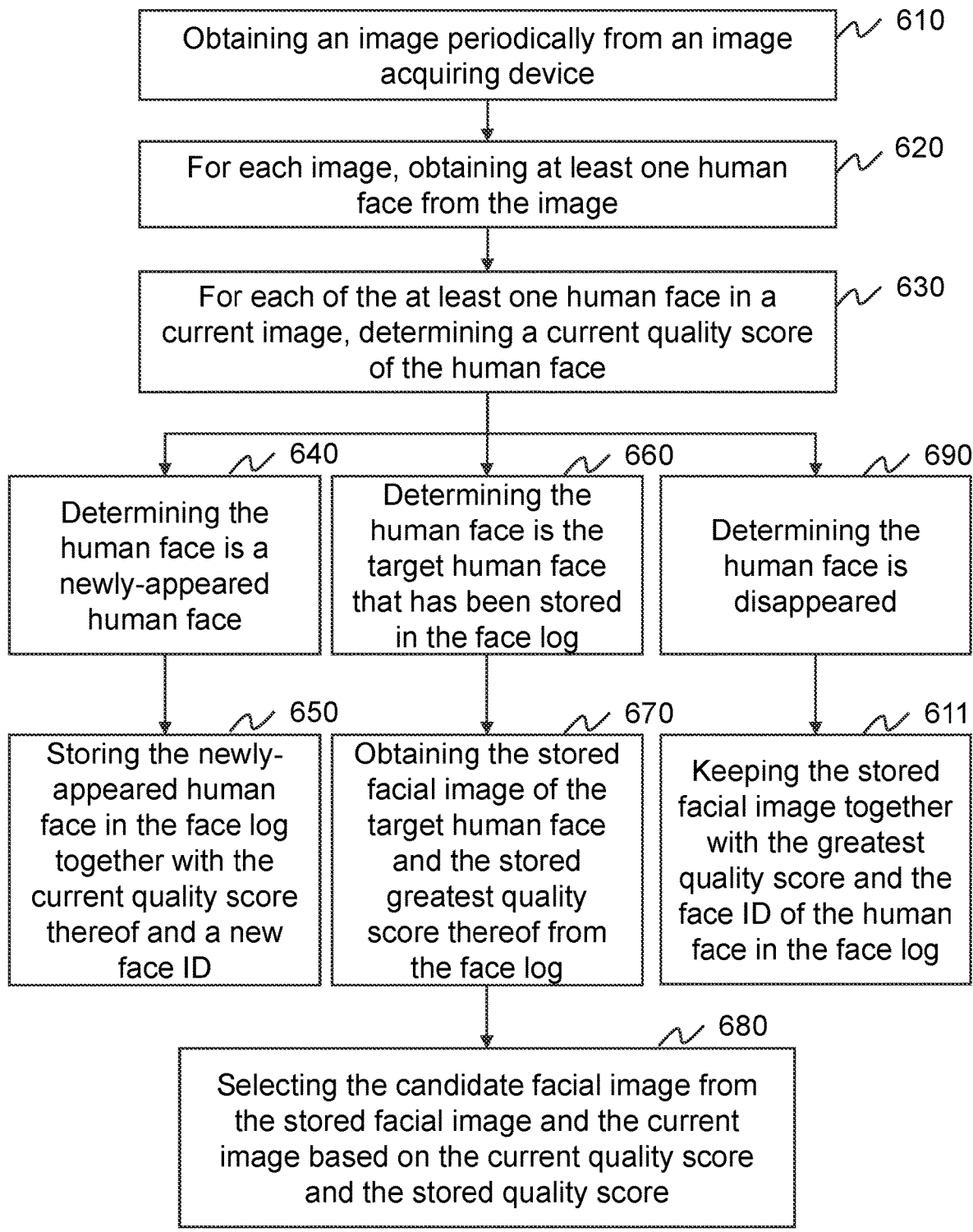

FIG. 6 is a flowchart illustrating an exemplary process 600 for operating a candidate facial image determining procedure according to some embodiments of the present disclosure. The process 600 may be executed by the system 100. For example, the process 600 may be implemented as a set of instructions (e.g., an application) stored in the storage ROM 230 and/or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing engine 112 (e.g., the processor 220, the candidate facial image determining module 410) may obtain an image periodically from an image acquiring device.

In some embodiments, the image acquiring device may be any electronic device that captures videos or images. For example, the image acquiring device may include a surveillance camera in a security monitoring system, a camera in a passenger flow analysis system, a mobile phone, a computer, a tablet computer, or the like, or any combination thereof. In some embodiments, the image may be a surveillance image obtained from a surveillance video that including a plurality of humans and environments around the image acquiring device. The processing engine 112 may identify human faces and other features (e.g., human bodies, any other objects, etc.) in the images.

In some embodiments, the processing engine 112 may obtain a current image in real-time, or obtain each image every predetermined period. For example, the processing engine 112 may obtain each image every second, every 0.5 seconds, every 0.2 seconds, every 0.1 seconds, etc. In some embodiments, the predetermined period may be pre-set by the processing engine 112 or the operator thereof, and stored in a storage device (e.g., the storage 140, the ROM 230 or the RAM 240, etc.). In some embodiments, the predetermined period may be determined according to different application scenes (e.g., the image quality of the video, processing speed of the processing engine 112, etc.).

In 620, for each image, the processing engine 112 (e.g., the processor 220, the candidate facial image determining module 410) may obtain at least one human face from the image.

In some embodiments, the processing engine 112 may implement a face detection algorithm on each image obtained from the image acquiring device to obtain the at least one human face. In some embodiments, the face detection algorithm may include a histogram rough segmentation algorithm, a singular value features detection algorithm, a binary wavelet transform algorithm, or the like, or any combination thereof. In some embodiments, each image may include at least one human faces. The processing engine 112 may identify each of the at least one human face, and assign a face ID to each of the at least one human face. The face ID may be the only identity of each human face in different images.

In some embodiments, the processing engine 112 may determine a state of the human face. The state may include newly appeared, ever appeared before, disappeared, or the like, or any combination thereof. In some embodiments, the processing engine 112 may identify whether the human face has ever appeared before according to a human image tracking algorithm. If the human face is newly-appeared, the processing engine 112 may create a new face ID for the newly-appeared human face. If the human face has ever appeared, the processing engine 112 may assign the corresponding appeared face ID for the appeared human face.

In 630, for each of the at least one human face in a current image, the processing engine 112 (e.g., the processor 220, the candidate facial image determining module 410) may determine a current quality score of the human face.

In some embodiments, the current quality score of a human face may reflect a quality of the human face in the current image. The higher the current quality score, the higher quality of the human face in the current image. For example, the quality may reflect whether the human face is clear in the current image, a size of the human face in the current image, a perspective of the human face in the current image (e.g., a side face, a front face, etc.). In some embodiments, the processing engine 112 may calculate the current quality score according to a process or an algorithm. For example, the processing engine 112 may obtain a scoring model that is trained by a plurality of historical face images to predict the current quality score of the human face. As another example, the processing engine 112 may calculate the current quality score according to a formula that is summarized by a plurality of historical experiences. Exemplary method or process for determining the current quality score may be found elsewhere in the present disclosure (e.g., FIG. 7 and the descriptions thereof).

In 640, the processing engine 112 (e.g., the processor 220, the candidate facial image determining module 410) may determine that the human face is a newly-appeared human face.

In some embodiments, the term "newly-appeared" may represent that a human face is never detected in the video or the plurality of images. In some embodiments, the processing engine 112 may automatically identify whether the human face is newly-appeared based on a human face tracking algorithm. The human face tracking algorithm may include any known algorithms, such as machine learning methods, deep learning methods, etc.

In 650, in response to a determination that the human face newly appears, the processing engine 112 (e.g., the processor 220, the candidate facial image determining module 410) may store the newly-appeared human face (or the image including the newly-appeared human face) in the face log together with the current quality score thereof and a new face ID.

In some embodiments, after determining that the human face newly appears, the processing engine 112 may create the new face ID for the newly appeared human face, and store the human face (or the image including the human face) together with the current quality score and the new face ID into the face log. The newly appeared human face or the corresponding image may be used to determine whether a human face has ever appeared in the further.

In 660, the processing engine 112 (e.g., the processor 220, the candidate facial image determining module 410) may determine the human face is the target human face that has been stored in the face log.

In some embodiments, the target human face that has been stored in the face log may be an ever appeared human face.

In some embodiments, the target human face may be stored in the face log together with the face ID, the corresponding greatest quality score before the current time point, the corresponding image (or facial image) of the target human face, or the like, or any combination thereof. In some embodiments, the processing engine 112 may identify whether the human face is the target human face according to the human face tracking algorithm. The human face tracking algorithm may include any known algorithms, such as machine learning methods, deep learning methods, etc.

In 670, the processing engine 112 (e.g., the processor 220, the candidate facial image determining module 410) may obtain the stored facial image of the target human face and the stored greatest quality score thereof from the face log.

In some embodiments, the processing engine 112 may access the face log to obtain the stored facial image of the target human face and the corresponding stored greatest quality score before the current time point.

In 680, the processing engine 112 (e.g., the processor 220, the candidate facial image determining module 410) may select the candidate facial image from the stored facial image and the current image based on the current quality score and the stored quality score.

In some embodiments, the processing engine 112 may compare the stored greatest quality score before the current time point with the current quality score. If the stored quality score is greater than the current quality score, the processing engine 112 may select the stored facial image as the candidate facial image. If the current quality score is greater than the stored quality score, the processing engine 112 may select the current facial image as the candidate facial image. The processing engine 112 may further store the current facial image and the corresponding current quality score into the face log to update the stored facial image and quality score of the face ID.

In some embodiments, the processing engine 112 may determine a difference between the stored quality score and the current quality score. The processing engine 112 may determine whether the difference is greater than a difference threshold. The difference threshold may be used to determine a value that the quality of the target human face varies to avoid keep selecting the candidate facial image due to minor variations of the quality scores. For example, if the difference is not greater than the difference threshold, the processing engine 112 may determine that the quality of the target human face is little changed, and the processing engine 112 may not update the stored facial image. Otherwise, the processing engine 112 may predict that the quality of the target human face is greatly changed, and the processing engine 112 may consider whether to update the stored facial image.

In 690, the processing engine 112 (e.g., the processor 220, the candidate facial image determining module 410) may determine the human face is disappeared.

In some embodiments, if the processing engine 112 cannot identify the human face in the current image, the processing engine 112 may determine that the human face is disappeared. In some embodiments, the processing engine 112 may identify whether the human face is disappeared according to the human face tracking algorithm. The human face tracking algorithm may include any known algorithms, such as machine learning methods, deep learning methods, etc.

In 611, the processing engine 112 (e.g., the processor 220, the candidate facial image determining module 410) may keep the stored facial image together with the greatest quality score and the face ID of the human face in the face log.

In some embodiments, the processing engine 112 may keep the greatest quality score of the disappeared human face stored in the face log. The processing engine 112 may determine the corresponding stored facial image as the candidate facial image of the disappeared human face.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 600.

Figure 7:
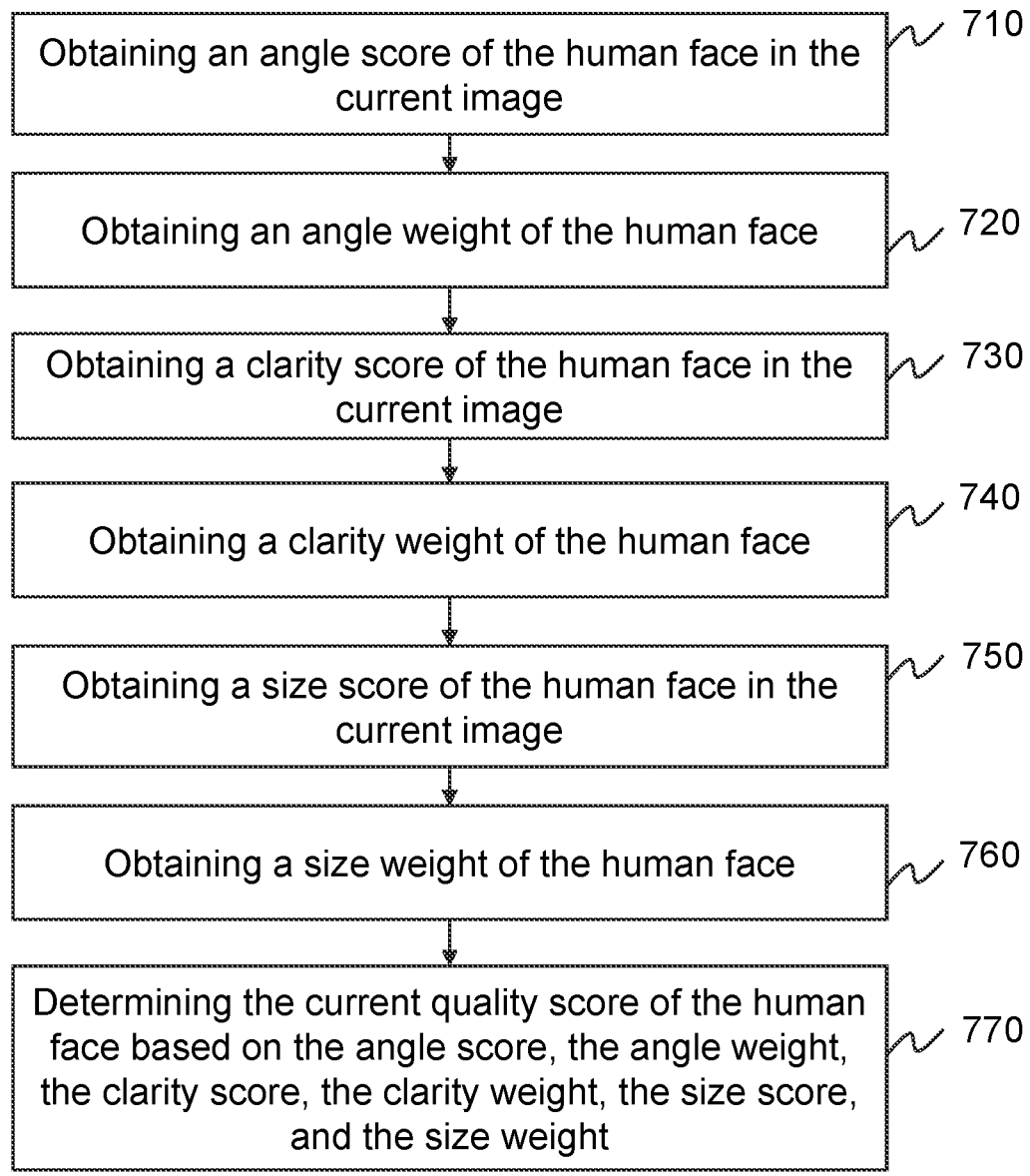
FIG. 7 is a flowchart illustrating an exemplary process for determining a current quality of a human face according to some embodiments of the present disclosure.

FIG. 7 is a flowchart illustrating an exemplary process 700 for determining a current quality score of a human face according to some embodiments of the present disclosure. The process 700 may be executed by the system 100. For example, the process 700 may be implemented as a set of instructions (e.g., an application) stored in the storage ROM 230 or the RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220, the candidate facial image determining module 410) may obtain an angle score of the human face in the current image.

In some embodiments, the angle score may reflect an angle of the identified human face. For example, a front face of the same human may have a greater angle score than a side face of the same human. In some embodiments, the processing engine 112 may calculate the angle score according to a face angle algorithm (e.g., a Support Vector Machine neural network). For example, the processing engine 112 may input the current image (or the current facial image of the human face) into an angle model. The angle model may be trained using a plurality of historical facial images. The angle model may output the angle score that represents the angle of the human face that the processing engine 112 identifies. Other methods or algorithms for determining the angle score may also be used and may not be limited here. In some embodiments, the angle score may be a normalized value. For example, the angle score may be a value from 0 to 1.

In 720, the processing engine 112 (e.g., the processor 220, the candidate facial image determining module 410) may obtain an angle weight of the human face.

In some embodiments, the angle weight may reflect an importance of the angle of the human face when determining the quality of the human face. The higher the angle weight, the more important of the angle when determining the quality of the human face. In some embodiments, the angle weight may be determined according to different application scenes and stored in a storage device (e.g., the storage 140, the ROM 230 or the RAM 240, etc.). For example, the processing engine 112 may determine the angle weight according to historical data. As another example, the operator of the processing engine 112 may determine the angle weight according to experiences. In some embodiments, the angle weight may be a value from 0 to 1.

In 730, the processing engine 112 (e.g., the processor 220, the candidate facial image determining module 410) may obtain a clarity score of the human face in the current image.

In some embodiments, the clarity score may reflect a clarity of the identified human face. For example, the greater the clarity score, the clearer of the human face that is identified in the current image. In some embodiments, the processing engine 112 may calculate the clarity score according to a face clarity algorithm. For example, the processing engine 112 may input the current image (or the current facial image of the human face) into a clarity model. The clarity model may be trained using a plurality of historical facial images. The clarity model may output the clarity score that represents the clarity of the human face that the processing engine 112 identifies. Other methods or algorithms for determining the clarity score (e.g., an energy gradient function) may also be used and may not be limited here. In some embodiments, the clarity score may be a normalized value. For example, the clarity score may be a value from 0 to 1.

In 740, the processing engine 112 (e.g., the processor 220, the candidate facial image determining module 410) may obtain a clarity weight of the human face.

In some embodiments, the clarity weight may reflect an importance of the clarity of the human face when determining the quality of the human face. The higher the clarity weight, the more important of the clarity when determining the quality of the human face. In some embodiments, the clarity weight may be determined according to different application scenes and stored in a storage device (e.g., the storage 140, the ROM 230 or the RAM 240, etc.). For example, the processing engine 112 may determine the clarity weight according to historical data. As another example, the operator of the processing engine 112 may determine the clarity weight according to experiences. In some embodiments, the clarity weight may be a value from 0 to 1.

In 750, the processing engine 112 (e.g., the processor 220, the candidate facial image determining module 410) may obtain a size score of the human face in the current image.

In some embodiments, the size score may reflect a size of the identified human face. For example, the greater the size score, the larger of the human face that is identified in the current image under the same scale. In some embodiments, the processing engine 112 may calculate the size score according to a face size algorithm. For example, the processing engine 112 may input the current image (or the current facial image of the human face) into a size model. The size model may be trained using a plurality of historical facial images. The size model may output the size score that represents the size of the human face that the processing engine 112 identifies. Other methods or algorithms for determining the size score (e.g., a face area detection algorithm) may also be used and may not be limited here. In some embodiments, the size score may be a normalized value. For example, the size score may be a value from 0 to 1.

In 760, the processing engine 112 (e.g., the processor 220, the candidate facial image determining module 410) may obtain a size weight of the human face.

In some embodiments, the size weight may reflect an importance of the size of the human face when determining the quality of the human face. The higher the size weight, the more important of the size when determining the quality of the human face. In some embodiments, the size weight may be determined according to different application scenes and stored in a storage device (e.g., the storage 140, the ROM 230 or the RAM 240, etc.). For example, the processing engine 112 may determine the size weight according to historical data. As another example, the operator of the processing engine 112 may determine the size weight according to experiences. In some embodiments, the size weight may be a value from 0 to 1.

In some embodiments, a sum of the angle weight, the clarity weight, and the size weight may be 1. For example, the angle weight is 0.2, the clarity weight is 0.6, and the size weight is 0.2. In some embodiments, the processing engine 112 may set the angle weight, the clarity weight, and the size weight according to an application scene. For example, if the best facial image of the target human face is used for studying a skin color of the target human face, the processing engine 112 may set the clarity weight as a higher value than the angle weight and the size weight.

In 770, the processing engine 112 (e.g., the processor 220, the candidate facial image determining module 410) may determine the current quality score of the human face based on the angle score, the angle weight, the clarity score, the clarity weight, the size score, and the size weight In some embodiments, the processing engine 112 may determine the current quality score based on all of the three scores and the corresponding weights. For example, the processing engine 112 may determine the current quality score according Equation (1):

$$S = s1*f1 + s2*f2 + s3*f3 \qquad (1),$$

wherein S denotes the current quality score, s1 denotes the angle score, f1 denotes the angle weight, s2 denotes the clarity score, f2 denotes the clarity weight, s3 denotes the size score, and f3 denotes the size weight.

In some embodiments, the processing engine 112 may determine the current quality score based on part of the three scores and the corresponding weights. For example, the processing engine 112 may determine the current quality score based on the clarity score, the clarity weight, the size score, and the size weight. The sum of the clarity weight and the size weight may be 1. As another example, the processing engine 112 may determine the current quality score based on the angle score, the angle weight, the size score, and the size weight. The sum of the angle weight and the size weight may be 1. As still another example, the processing engine 112 may determine the current quality score based on the angle score, the angle weight, the clarity score, and the clarity weight. The sum of the angle weight and the clarity weight may be 1.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for selecting a best facial image of a target human face, comprising:
at least one storage medium including a set of instructions for selecting the facial image including the target human face; and
at least one processor in communication with the storage medium, wherein when executing the set of instructions, the at least one processor is directed to:
determine whether a candidate facial image is obtained before a time point in a time period threshold, wherein the candidate facial image has a greatest quality score of the target human face among a plurality of facial images of the target human face;
in response to a determination that the candidate facial image is obtained before the time point, determine the candidate facial image as the best facial image of the target human face;
in response to a determination that the candidate facial image is obtained after the time point, increase the time period threshold; and
operate a candidate facial image determining procedure; and
store the best facial image together with a face ID and the greatest quality score of the target human face in a face log, wherein to operate the candidate facial image determining procedure, the at least one processor is directed to:
obtain an image periodically from an image acquiring device;
for each image, obtain at least one human face from the image;
for each of the at least one human face in a current image,
determine a current quality score of the human face;
determine whether the human face is the target human face that has been stored in the face log;
in response to a determination that the human face is the target human face, obtain the stored facial image of the target human face and the stored greatest quality score thereof from the face log; and
select the candidate facial image from the stored facial image and the current image based on the current quality score and the stored quality score.

2. The system of claim 1, wherein before determining whether the candidate facial image is obtained before the time point, the at least one processor is further directed to:
determine whether a detecting time period of the target human face is greater than the time period threshold; and
in response to a determination that the detecting time period is greater than the time period threshold, determine whether the candidate facial image is obtained before the time point.

3. The system of claim 2, wherein the at least one processor is further directed to:
in response to a determination that the detecting time period is not greater than the time period threshold, operate a candidate facial image determining procedure.

4. The system of claim 1, wherein the at least one processor is directed to:
in response to a determination that the human face is not the target human face, determine whether the human face is a newly-appeared human face; and
in response to a determination that the human face is the newly-appeared human face, store the newly-appeared human face in the face log together with the current quality score thereof and a new face ID.

5. The system of claim 1, wherein to determine the current quality score of the human face, the at least one processor is further directed to:
obtain an angle score of the human face in the current image; and
obtain an angle weight of the human face.

6. The system of claim 5, wherein the at least one processor is directed to:
obtain a clarity score of the human face in the current image; and
obtain a clarity weight of the human face.

7. The system of claim 6, wherein the at least one processor is directed to:
obtain a size score of the human face in the current image; and
obtain a size weight of the human face.

8. The system of claim 7, wherein the at least one processor is directed to:
determine the current quality score of the human face based on the angle score, the angle weight, the clarity score, the clarity weight, the size score, and the size weight.

9. A method for selecting a best facial image of a target human face, comprising:
determining whether a candidate facial image is obtained before a time point in a time period threshold, wherein the candidate facial image has a greatest quality score of the target human face among a plurality of facial images of the target human face;
in response to a determination that the candidate facial image is obtained before the time point, determining the candidate facial image as the best facial image of the target human face;
in response to a determination that the candidate facial image is obtained after the time point, increase the time period threshold; and
operate a candidate facial image determining procedure; and
storing the best facial image together with a face ID and the greatest quality score of the target human face in a face log, wherein to operate the candidate facial image determining procedure, the at least one processor is directed to:
obtain an image periodically from an image acquiring device;
for each image, obtain at least one human face from the image;
for each of the at least one human face in a current image,
determine a current quality score of the human face;
determine whether the human face is the target human face that has been stored in the face log;
in response to a determination that the human face is the target human face, obtain the stored facial image of the target human face and the stored greatest quality score thereof from the face log; and
select the candidate facial image from the stored facial image and the current image based on the current quality score and the stored quality score.

10. The method of claim 9, wherein before determining whether the candidate facial image is obtained before the time point, the method further includes:
determining whether a detecting time period of the target human face is greater than the time period threshold; and
in response to a determination that the detecting time period is greater than the time period threshold, determining whether the candidate facial image is obtained before the time point.

11. The method of claim 10 further comprising:
in response to a determination that the detecting time period is not greater than the time period threshold, operating a candidate facial image determining procedure.

12. The method of claim 9, further comprising:
in response to a determination that the human face is not the target human face, determining whether the human face is a newly-appeared human face; and
in response to a determination that the human face is the newly-appeared human face, storing the newly-appeared human face in the face log together with the current quality score thereof and a new face ID.

13. The method of claim 9, wherein the determining the current quality score of the human face includes:
obtaining an angle score of the human face in the current image; and
obtaining an angle weight of the human face.

14. The method of claim 13 further comprising:
obtaining a clarity score of the human face in the current image; and
obtaining a clarity weight of the human face.

15. The method of claim 14 further comprising:
obtaining a size score of the human face in the current image;
obtaining a size weight of the human face; and
determining the current quality score of the human face based on the angle score, the angle weight, the clarity score, the clarity weight, the size score, and the size weight.

16. A non-transitory readable medium, comprising at least one set of instructions for selecting a best facial image of a target human face, wherein when executed by at least one processor of an electrical device, the at least one set of instructions directs the at least one processor to perform a method, the method comprising:
determining whether a candidate facial image is obtained before a time point in a time period threshold, wherein the candidate facial image has a greatest quality score of the target human face among a plurality of facial images of the target human face;
in response to a determination that the candidate facial image is obtained before the time point, determining the candidate facial image as the best facial image of the target human face;
in response to a determination that the candidate facial image is obtained after the time point, increase the time period threshold; and
operate a candidate facial image determining procedure; and storing the best facial image together with a face ID and the greatest quality score of the target human face in a face log, wherein to operate the candidate facial image determining procedure, the at least one processor is directed to:
obtain an image periodically from an image acquiring device;
for each image, obtain at least one human face from the image;
for each of the at least one human face in a current image,
determine a current quality score of the human face;
determine whether the human face is the target human face that has been stored in the face log;
in response to a determination that the human face is the target human face, obtain the stored facial image of the target human face and the stored greatest quality score thereof from the face log; and
select the candidate facial image from the stored facial image and the current image based on the current quality score and the stored quality score.

\* \* \* \* \*